United States Patent [19]
Meinherz et al.

[11] Patent Number: 6,087,590
[45] Date of Patent: *Jul. 11, 2000

[54] ENCLOSED HIGH-VOLTAGE ELECTRIC LINE

[75] Inventors: Manfred Meinherz; Dieter Lorenz, both of Berlin, Germany

[73] Assignee: Siemens Aktiengesellschaft, Munich, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/867,052

[22] PCT Filed: Nov. 24, 1995

[86] PCT No.: PCT/DE95/01703

§ 371 Date: Jul. 9, 1998

§ 102(e) Date: Jul. 9, 1998

[87] PCT Pub. No.: WO96/17422

PCT Pub. Date: Jun. 6, 1996

[30] Foreign Application Priority Data

Dec. 1, 1994 [DE] Germany .............................. 44 44 554

[51] Int. Cl.⁷ .............................. H02G 5/00; H02G 5/06; H01B 9/00

[52] U.S. Cl. ........................ 174/99 R; 174/99 B; 174/24; 174/28; 174/25 G

[58] Field of Search ................................. 174/99 R, 99 B, 174/99 E, 24, 25 G, 28, 200; 28/828

[56] References Cited

U.S. PATENT DOCUMENTS

| | | | |
|---|---|---|---|
| 2,207,522 | 7/1940 | Smith et al. | 174/28 |
| 2,218,921 | 10/1940 | Mieller | 174/28 |
| 2,939,903 | 6/1960 | Lapsley et al. | 174/28 |
| 4,414,424 | 11/1983 | Mizoguchi et al. | 174/28 |
| 5,488,199 | 1/1996 | Selsing et al. | 174/73.1 |

*Primary Examiner*—Kristine Kincaid
*Assistant Examiner*—Mark Olds
*Attorney, Agent, or Firm*—Kenyon & Kenyon

[57] ABSTRACT

An enclosed high-voltage electric line having a high-voltage electric conductor (2) which is supported inside an enclosure (1) by one or more supporting elements (3, 4, 5), each with at least one insulator part (6, 7, 8). The conductor has at least one borehole (12, 13, 14) to accommodate one end of each supporting element (3, 4, 5). At least one supporting element has a metallic sleeve (9, 10, 11) that passes at least partially through the borehole, is supported in the area of the edge of the borehole, surrounds part of the insulator part and forms in its interior a stop (18) that limits displacement of the insulator part into the borehole.

7 Claims, 3 Drawing Sheets

ENCLOSED HIGH-VOLTAGE ELECTRIC LINE

FIELD OF THE INVENTION

The present invention relates to an enclosed highvoltage electric line.

BACKGROUND INFORMATION

U.S. Pat. No. 2,280,200 describes a coaxial electric line where the internal conductor has diametrically opposed pairs of boreholes into which are inserted the post insulators which are supported on the inside wall of an enclosure and thus secure the conductor coaxially to the enclosure.

U.S. Pat. No. 3,344,370 describes a method of securing a conductor within an enclosure by means of post insulators. The ends of the post insulators that extend beyond the conductor may each be surrounded by a sleeve to set the distance between the conductor and the enclosure.

German Patent No. 31 41 437 describes a high-voltage conductor provided with supporting elements, each having on the high-voltage side a metallic liner in which a screw that passes through the high-voltage conductor engages. An electrically conducting foot that slides along the enclosure wall is provided at the other end of the respective supporting element.

U.S. Pat. No. 2,207,522 describes a coaxial line where the post-shaped insulator parts are held in sleeves that also form field electrodes and where a gap that is filled with a cement is also provided between the sleeves and the insulator parts.

SUMMARY OF THE INVENTION

The present invention is directed to an enclosed high-voltage electric line with a high-voltage electric conductor which is supported by means of one or more supporting elements, each with at least one insulator part inside the enclosure and which has at least one borehole to accommodate one end of a supporting element. At least one supporting element has a metallic sleeve that passes at least partially through the borehole, is supported in the area of the edge of the borehole, surrounds a portion of the insulator part and forms a stop in its interior to limit any displacement of the insulator part into the borehole. The sleeve is cylindrical in design, partially surrounds a part of the insulator body that projects out of the outside surface of the high-voltage conductor and has a field control electrode there that concentrically surrounds the respective insulator part.

An object of the present invention is to provide such a high-voltage line so as to have an especially great high-voltage strength and long useful life while being inexpensive and easy to assemble. This object is achieved according to the present invention by the fact that the sleeve is partially in direct contact with the insulator part and is widened in the area of the field control electrode so that the field control electrode surrounds the insulator part at a distance.

In accordance with the present invention, the insulator part is protected by a sleeve in the area where the borehole passes through the high-voltage conductor and it is also supported inside this sleeve so that the sleeve transmits the supporting force of the insulator to the high-voltage conductor. This guarantees that the insulator part is not supported directly on the high-voltage conductor as is the case, for example, with the coaxial line described in U.S. Pat. No. 2,280,200. Such an area where the insulator part is supported on the high-voltage conductor and is thus exposed to high mechanical loads should not be additionally exposed to dielectric loads.

According to the present invention, the area where the insulator part of the supporting element is supported is located inside the metallic sleeve and is thus in a field-free space. The metallic sleeve is in turn supported on the high-voltage conductor in the area of the edge of the borehole.

Supporting elements can be assembled prior to mounting by pushing the sleeves onto the insulator parts. Only boreholes need be provided in the high-voltage conductor. No other processing of the high-voltage conductor is necessary.

The supporting elements can be distributed in a spiral pattern, for example, along the high-voltage line between the high-voltage conductor and the enclosure. Several supporting elements may also be arranged at the same level in the axial direction of the high-voltage line if they do not project too far into the high-voltage conductor. With a horizontal position of the high-voltage conductor, it may even be sufficient for the conductor to be supported only against the enclosure wall at the bottom.

In accordance with the present invention, dielectric shielding is provided for the edge of the borehole in the high-voltage conductor. The edge of the contact area between the insulator part and the sleeve is also shielded in this way. The field distribution between the high-voltage conductor and the enclosure, which is normally made of metal, is leveled out by the field control electrode so that there is no risk of discharge, in particular at those locations where components with different dielectric constants come in contact.

The insulator part is supported inside the sleeve and is also guided at the side in an advantageous manner. For this purpose, the sleeve is in tight contact around some of the circumference of the insulator part. However, in the area of the field control electrode, the sleeve is widened in comparison with the outside diameter of the insulator part so that these two parts of the supporting element do not contact each other in the area of the field control electrode. The contact area between the insulator part and the sleeve thus begins only in an area that is shielded by the field control electrode to the extent that it is practically field-free, thus resulting in no dielectric load in this area.

For example, particles that are inside the enclosure and could move under the influence of a high voltage might collect in this area. This area thus also forms a particle trap.

According to another embodiment of the present invention, the high-voltage conductor is designed to be hollow and to have two diametrically opposed boreholes. A first borehole passes through the respective sleeve and a second borehole passes at least partially through the sleeve. With this design, the respective sleeve is secured especially well in the high-voltage conductor so that transverse forces acting on the supporting element caused, for example, by thermal expansion of the high-voltage conductor, and the corresponding sliding movement of the supporting element along the enclosure wall are absorbed especially well.

In this case, the sleeve may be designed, for example, so that in the area of the second borehole it has a bottom that smoothly closes off the borehole toward the outside to yield a design that is favorable in terms of dielectric properties. Another advantageous provision is for the second borehole to be a blind hole.

Thus the outside surface of the high-voltage conductor remains intact in the area of the second borehole.

Another advantageous option is for the stop to be formed by a bottom of the sleeve. In this case, the respective insulator part is supported on the bottom of the sleeve. This makes available an especially large area to take up the supporting forces.

In another embodiment of the present invention, the insulator part is supported on the bottom of the respective sleeve with an intermediate spring element. This makes it possible to compensate for tolerances in the manufacture and assembly of the high-voltage line and to assure that all the supporting elements are in tight contact with the enclosure wall.

In another embodiment, the end of the supporting element that faces the enclosure wall has an electrically conducting, grounded foot that is in sliding contact with the enclosure wall. This foot may consist of a plastic plate, in particular made of PTFE, which is inserted into a recess in the insulator part where it is snapped behind an undercut in an advantageous manner and which a conductive material covers or passes through to make it electrically conducting.

It is also possible for the conducting feet of different supporting elements to be conductively connected to each other by means of a grounded conductor.

In addition, the insulator part may also be supported on the foot with an intermediate spring element. This measure can also ensure that the supporting elements will be in close contact with the enclosure wall because a high dielectric load would result if a gap developed without contact and a conducting connection in this area.

DETAILED DESCRIPTION

Figure 1:
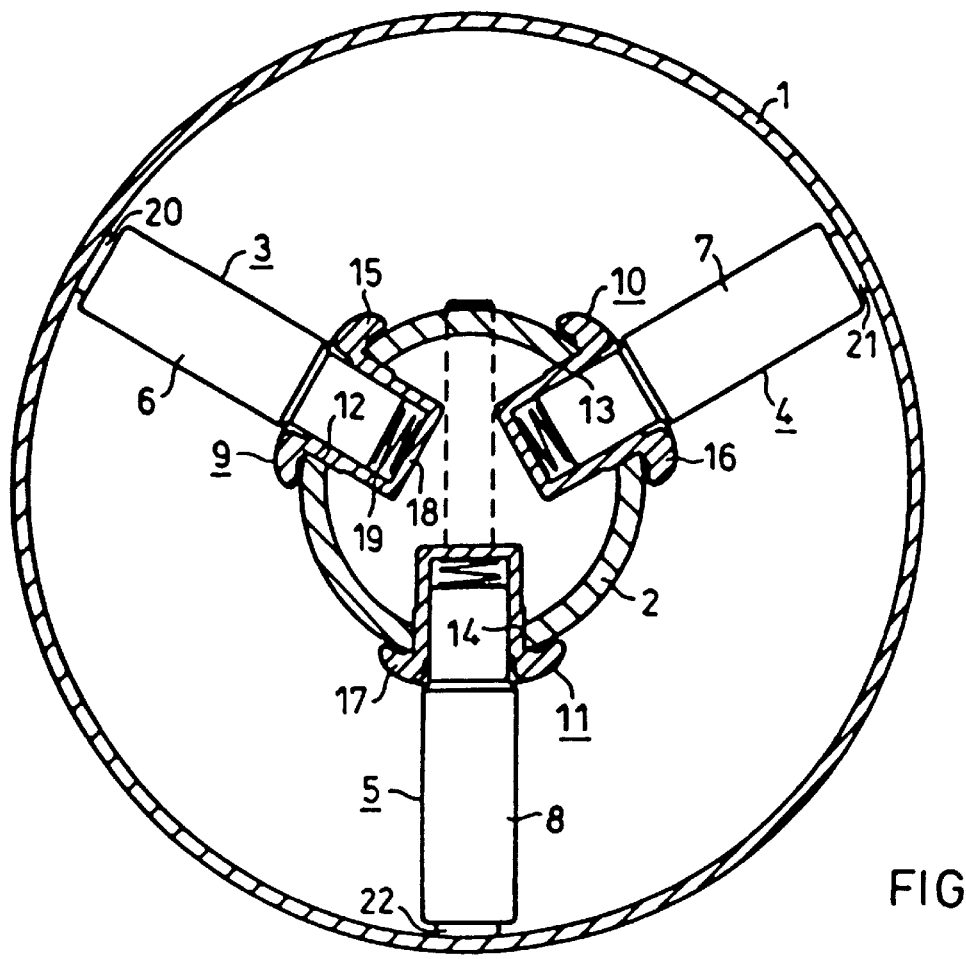
FIG. 1 shows a cross-sectional view of a high-voltage line with three supporting elements.

FIG. 1 shows a cross-sectional view of a high-voltage line with an enclosure 1 and a high-voltage conductor 2 secured concentrically and coaxially inside the enclosure 1 by means of supporting elements 3, 4 and 5. Supporting elements 3, 4 and 5 can be offset axially relative to each other in the longitudinal direction of the high-voltage line or they may also be arranged at the same level.

Each supporting element 3, 4, 5 has an insulator part 6, 7, 8 that is designed to have a cylindrical rod shape. In addition, each supporting element 3, 4, 5 has a sleeve 9, 10, 11 made of metal, in particular aluminum, into which the end of insulator parts 6, 7, 8 facing the high-voltage conductor 2 is inserted. The inserted ends of insulator parts 6, 7, 8 each have a smaller diameter than the exposed ends of insulator parts 6, 7, 8.

Sleeves 9, 10, 11 are each designed to be pot-shaped and cylindrical and each is inserted into a borehole 12, 13, 14 of the high-voltage conductor 2. Each sleeve 9, 10, 11 has a rim that is designed as a field electrode 15, 16, 17 and concentrically surrounds one of the insulator parts 6, 7, 8 at a distance. Each of sleeves 9, 10, 11 has as a stop for the respective insulator part 6, 7, 8 a bottom 18 on which the respective insulator part 6, 7, 8 is supported with an intermediate spring element 19. It is thus ensured that each of the insulator parts 6, 7, 8 is pressed with its respective foot 20, 21, 22 against the inside wall of enclosure 1. Insulator parts 6, 7, 8 can be displaced axially in the respective sleeve 9, 10, 11 but they are guided laterally and protected from tilting.

Sleeves 9, 10, 11 are inserted so far into the respective boreholes 12, 13, 14 of high-voltage conductor 2 that field electrodes 15, 16, 17 come to lie on the surface of high-voltage conductor 2 in the edge area of boreholes 12, 13, 14 and are supported there.

Figure 2:
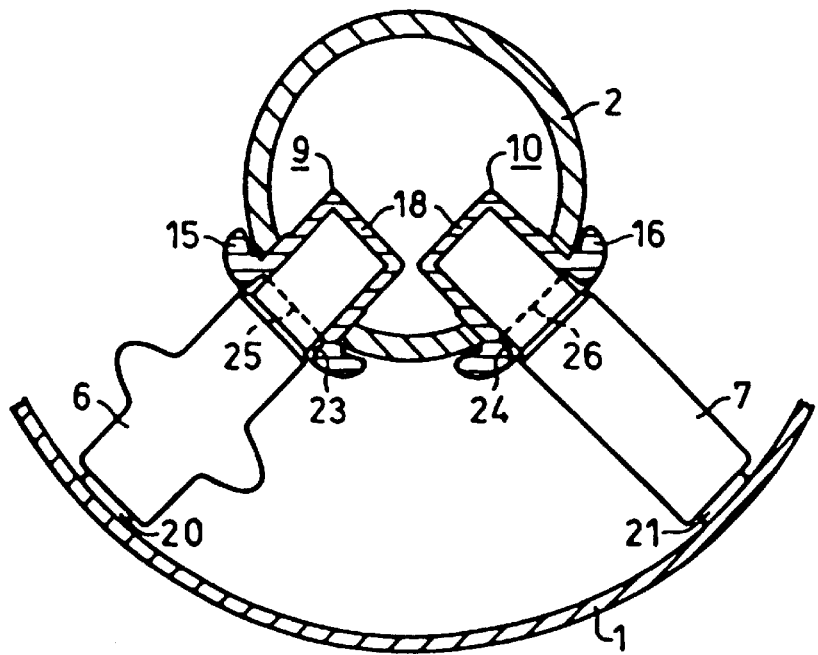
FIG. 2 shows a detail of a high-voltage line with two supporting elements.

FIG. 2 illustrates another embodiment of the present invention in which insulator parts 6 and 7 are supported on the bottoms 18 of the respective sleeves 9 and 10, forming a stop, without intermediate spring elements. This is advantageous, for example, when the high-voltage conductor 2 runs horizontally so that the force due to the weight of high-voltage conductor 2 is sufficient to guarantee that insulator parts 6 and 7 will be in tight contact with the wall of enclosure 1. In this case, high-voltage conductor 2 need not be supported at the top.

Due to the design of insulator parts 6, 7 with a reduced diameter in the area inserted into the respective sleeve 9, 10 and due to a recess in the respective sleeve 9, 10 at its inside in the area of field electrodes 15, 16, a space 23, 24 is created between field electrodes 15, 16 and insulator parts 6, 7. The space 23, 24 is shielded by field electrodes 15, 16 from the electric field prevailing between high-voltage conductor 2 and enclosure 1 and it can act as a particle trap. In this area, the end of the contact area is arranged between the respective sleeve 9, 10 and the corresponding insulator part 6, 7. This yields a line 25, 26 on the circumference of the insulator part as indicated with a dotted line in FIG. 2. The three media, metal (sleeve), insulation material (insulator part) and gas, such as $SF_6$ surrounding high-voltage conductor 2, come in contact along this line. The dielectric load is especially great in the area of this dividing line and therefore it is important for this line to be shielded by a field electrode and to be arranged in an area behind the field electrode due to the recesses in the field electrodes and the design of the insulator parts.

Due to the fact that insulator parts 6, 7 are each held in a metallic sleeve 9, 10 in the area of borehole 12, 13 in high-voltage conductor 2, the respective insulator part 6, 7 is also protected from mechanical damage when inserted into the boreholes and when there are mechanical loads on the sharp edge (due to processing) of the respective borehole in high-voltage conductor 2 during operation.

Figure 3:
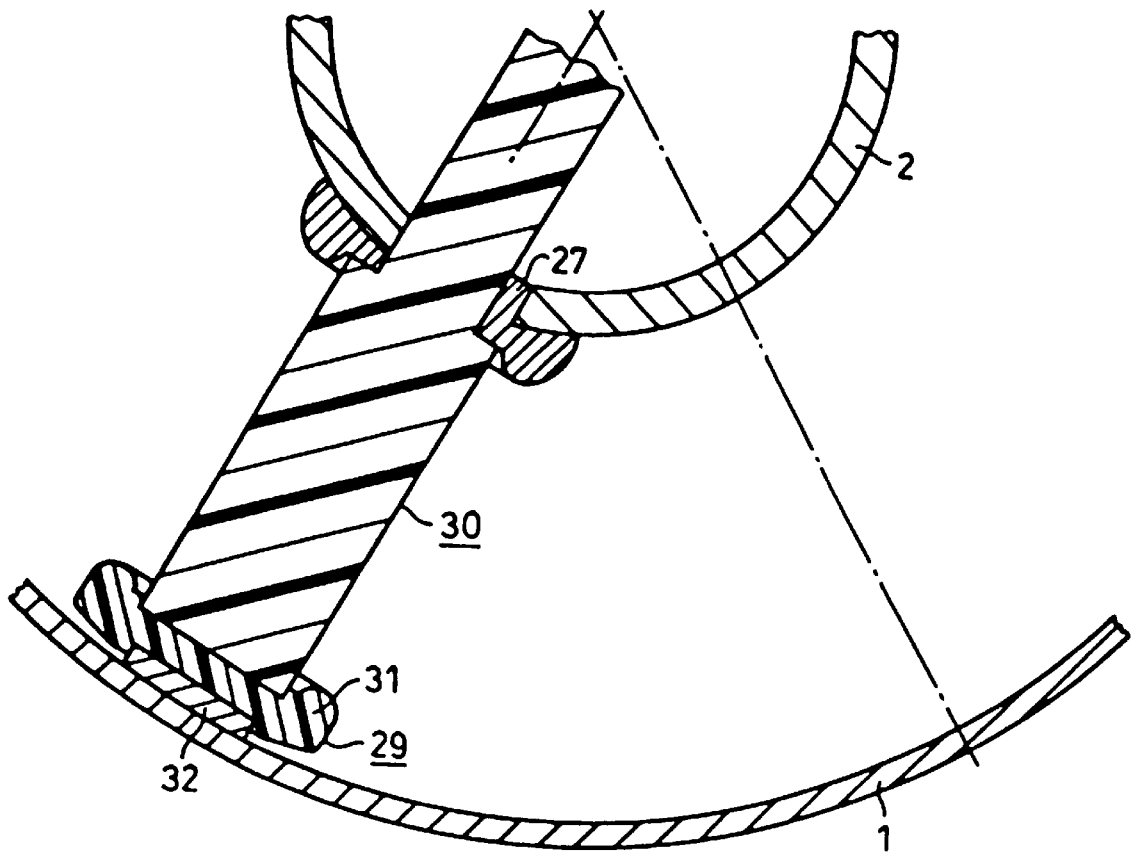
FIG. 3 shows a portion of a high-voltage line with one supporting element.

FIG. 3 shows a cross-sectional view of an embodiment in which sleeve 27 may optionally project only partially into borehole 28. Foot 29 of supporting element 30 is formed there by an insulator part 31 and an electrically conducting sliding plate 32 that is spring mounted in the insulator part.

Figure 4:
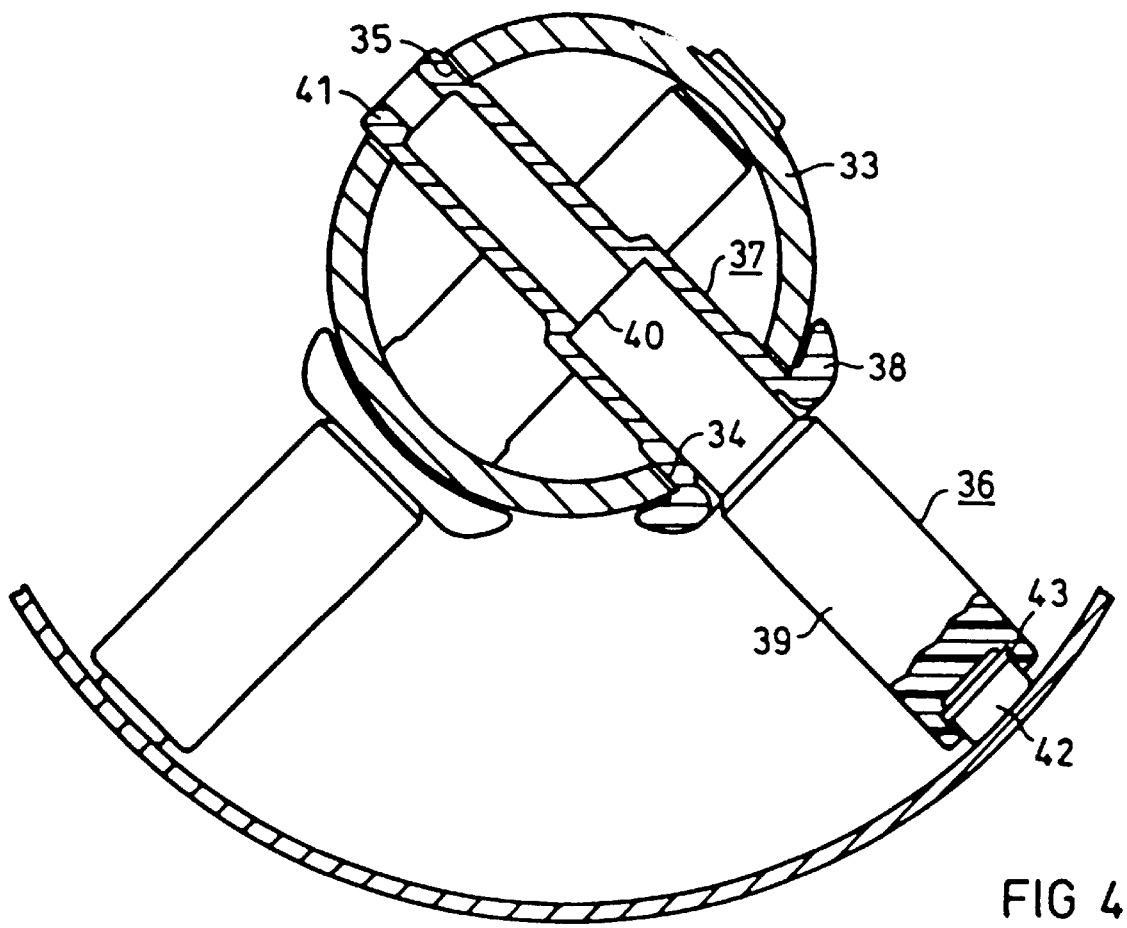
FIG. 4 shows a cross-sectional view of a portion of a high-voltage line with two supporting elements.

FIG. 4 shows a high-voltage conductor 33 that has two diametrically opposed boreholes 34, 35 for each supporting element 36. Sleeve 37 of supporting element 36 passes through both boreholes 34 and 35. With its field electrode 38, sleeve 37 is in contact with the edge of borehole 34 through which insulator part 39 passes. Sleeve 37 has a shoulder 40 that forms the stop for insulator part 39. Part 41 of sleeve 37, which projects through borehole 35 through which the insulator part 39 does not pass, is designed as a field electrode that provides dielectric shielding for borehole 35 in high-voltage conductor 2.

Foot 42 of supporting element 36 is designed as a cylindrical plastic part made of a plastic such as PTFE filled with a conducting material and having a rim 43 that snaps elastically into an undercut in insulator part 39 and is thus secured.

Figure 5:
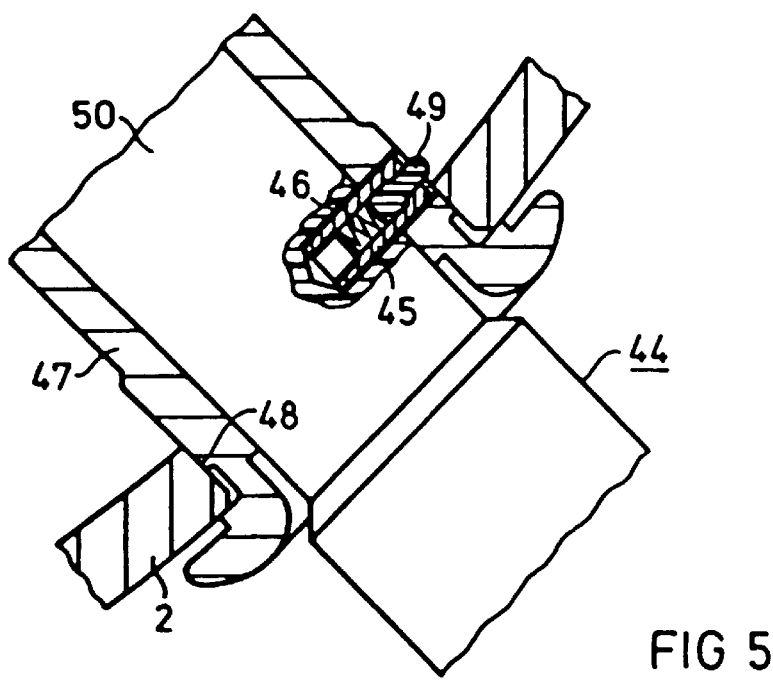
FIG. 5 shows a detail of a supporting element.

FIG. 5 shows a fastening device for a supporting element 44 that has a guide sleeve 45 and a pin 49 that is spring-loaded by means of spring 46 and can be displaced axially in the sleeve. Guide sleeve 45 passes through both insulator part 50 of supporting element 44 and sleeve 47 of supporting element 44 and thus fixes these two parts with respect to each other. Pin 49 can be retracted within guide sleeve 45 to the extent that it does not project beyond the surface of sleeve 47. On insertion of sleeve 47 into borehole 48 of high-voltage conductor 2, pin 49 moves forward under the influence of spring 46 after passing borehole 48 and thus catches behind the edge of borehole 48 in high-voltage conductor 2, thus preventing supporting element 44 from falling out of borehole 48.

What is claimed is:

1. A substantially horizontally running high-voltage electric line, comprising:

an enclosure;

two supporting elements having first ends, each of the two supporting elements including an insulator part;

a high-voltage electric conductor which is supported inside the enclosure by the two supporting elements and which has at least two boreholes to accommodate the first ends of the two supporting elements, wherein each of the two supporting elements includes a metallic sleeve which passes at least partially through a respective borehole of the at least two boreholes and is supported in an area of an edge of the respective borehole, and wherein the sleeve:

surrounds a portion of the insulator part and includes a stop that limits displacement of the insulator part into the respective borehole, is substantially cylindrical, and includes a field control electrode which concentrically surrounds the portion of the insulator part, and is partially in direct contact with the insulator part and is widened in an area of the field control electrode so that there is an annular space between the field control electrode and the insulator part, the annular space being substantially shielded by the field electrode from an electric field between the enclosure and the high-voltage electric conductor.

2. The high-voltage electric line of claim 1, wherein the high-voltage conductor is hollow and has first and second diametrically opposed boreholes, and wherein the sleeve passes through the first borehole and at least partially through the second borehole.

3. The high-voltage electric line of claim 2, wherein the second borehole is a blind hole.

4. The high-voltage electric line of claim 1, wherein the stop is formed by a bottom of the sleeve.

5. The high-voltage electric line of claim 1, wherein the insulator part is supported on a bottom of the sleeve with an intermediate spring element.

6. The high-voltage electric line of claim 1, wherein a second end of the supporting element which faces the enclosure has an electrically conducting grounded foot that is in sliding contact with the enclosure.

7. The high-voltage electric line of claim 1, wherein the insulator part is supported on a sliding plate with an intermediate spring element.

* * * * *